US008531593B2

(12) United States Patent
Shen et al.

(10) Patent No.: US 8,531,593 B2
(45) Date of Patent: Sep. 10, 2013

(54) DISPLAY PANEL WITH IMAGE CAPTURE MODULE AND ASSEMBLING METHOD OF THE SAME

(75) Inventors: Chi Chih Shen, Hsinchu (TW); Hui Hsuan Chen, Hsinchu (TW); Wei Chung Wang, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 127 days.

(21) Appl. No.: 12/892,717

(22) Filed: Sep. 28, 2010

(65) Prior Publication Data

US 2012/0019715 A1    Jan. 26, 2012

(30) Foreign Application Priority Data

Jul. 23, 2010  (TW) .............................. 99124408 A

(51) Int. Cl.
*H04N 5/225*  (2006.01)
*H04N 3/14*  (2006.01)
*H04N 5/335*  (2011.01)

(52) U.S. Cl.
USPC .......................................... 348/373; 348/294

(58) Field of Classification Search
None
See application file for complete search history.

(56) References Cited

U.S. PATENT DOCUMENTS

2006/0140617 A1* 6/2006 Xu et al. ....................... 396/268
2010/0033647 A1* 2/2010 Okita et al. ..................... 349/57

* cited by examiner

*Primary Examiner* — Justin P Misleh
(74) *Attorney, Agent, or Firm* — Morris Manning & Martin LLP; Tim Tingkang Xia, Esq.

(57) ABSTRACT

A display panel and an assembling method of the same are described. An image capture module is electrically disposed on a substrate of a display module, such that the image capture module and the display module are combined into an integrated structure, so as to reduce the overall size of a display assembled by using the display panel.

5 Claims, 11 Drawing Sheets

DISPLAY PANEL WITH IMAGE CAPTURE MODULE AND ASSEMBLING METHOD OF THE SAME

CROSS-REFERENCE TO RELATED APPLICATIONS

This non-provisional application claims priority under 35 U.S.C. §119(a) on Patent Application No(s). 099124408 filed in Taiwan, R.O.C. on Jul. 23, 2010, the entire contents of which are hereby incorporated by reference.

BACKGROUND OF THE INVENTION

1. Field of Invention

The present invention relates to a display panel, and more particularly, to a display panel with an integrated structure of an image capture module and a display module and an assembling method of the same.

2. Related Art

With the rapid development of electronics industry, presently, electronic products are developed towards the design trend of variety, in which the development and design of light, thin, short, and small electronic products become the mainstream in the market. Due to advantages of being light and thin, power saving, and free of irradiation, liquid crystal displays (LCDs) have been widely used in various electronic devices, such as, notebook computers, personal digital assistants (PDAs), mobile phones, tablet personal computers (table PCs), and handheld game consoles, so as to enable the electronic devices to meet requirements of light weight.

Moreover, along with the increase of the communication bandwidth and the use of visual communication technologies, for example, visual communication becomes more and more popular, presently, most of the electronic products generally have an image capture module, such that the electronic products have the image display function and the image capture function simultaneously, and enable the user to interact with a remote user through the image capture module or to record a personal video frame.

Taking a notebook computer as an example, the notebook computer comprises a base and a display. The display is pivoted on the base, and a display panel and an image capture module are disposed in the display. The display panel and the image capture module are individually disposed in a case of the display through two different assembling processes. The image capture module is generally disposed at a side edge position adjacent to the display panel, such that the image capture module is located above the display panel to capture an image of the user when the display is unfolded as being rotated around a pivot with respect to the base.

However, as for the conventional arrangement mode of the image capture module and the display panel, in order to accommodate the image capture module and the display panel in the case of the display together, the thickness or length of the case of the display cannot be reduced, thus resulting in the problems that the overall size of the display is too large and the weight is increased, and furthermore, the assembling process is too complex. As for the electronic products with increasing requirements on light weight, thin size and portable convenience, such problems cause obstructions in development and design, thus resulting in loss of competitiveness and influence on the purchase intention of consumers.

SUMMARY OF THE INVENTION

Accordingly, the present invention is a display panel and an assembling method of the same, so as to eliminate the problem that the overall size of the display cannot be reduced as an image capture module and a display panel of a conventional display occupy a large volume in a case.

The present invention provides a display panel, which comprises a display module and at least one image capture module. The display module has a substrate, and the substrate has a first surface and a second surface opposite to each other. The image capture module is disposed on the first surface of the substrate, and the image capture module is coupled to the substrate.

The present invention further provides an assembling method of a display panel, which comprises the following steps. First, a display module is provided. The display module has a substrate, and the substrate has a first surface and a second surface opposite to each other. Next, an image capture module is disposed on the first surface of the substrate, and is coupled to the substrate.

The efficacy of the present invention is that, during the manufacturing of the display panel, the image capture module is electrically disposed on the substrate of the display module together, such that the image capture module and the display module are combined into an integrated structure, and thus the overall size (volume) of the display assembled by using the display panel is reduced.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The display panel of the present invention is applied in displays, for example, liquid crystal display (LCD), of electronic devices, such as, desk-top computers, notebook computers, mobile phones, personal digital assistants (PDAs), tablet personal computers (table PCs), and electronic books. The above description is merely illustrated as examples, but not intended to limit the present invention.

Figure 2:
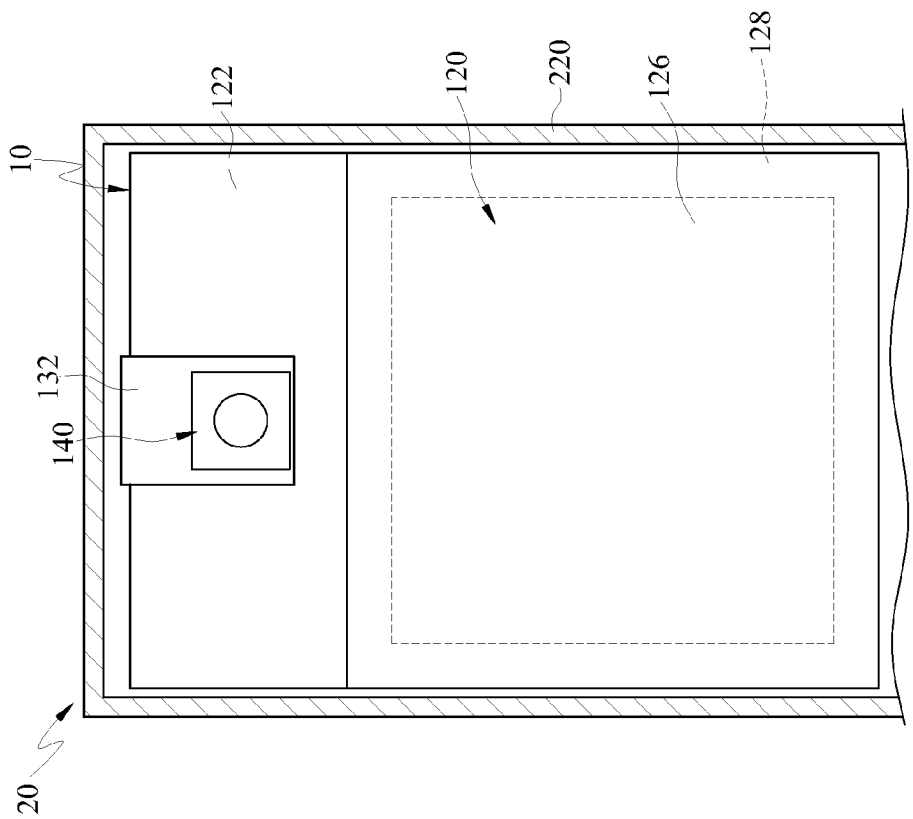
FIG. 2 is a schematic plan view of the first embodiment of the present invention.
Figure 1:
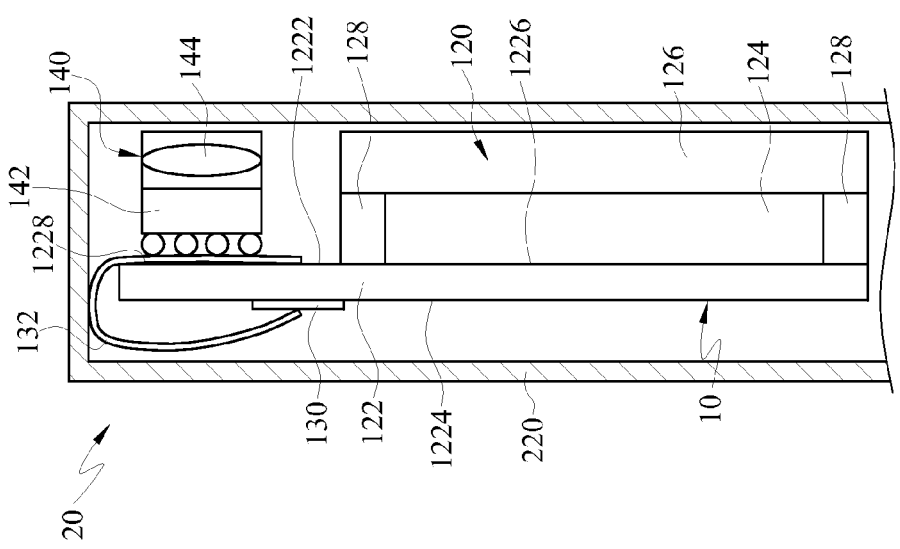
FIG. 1 is a cross-sectional side view of a first embodiment of the present invention.
Figure 3:
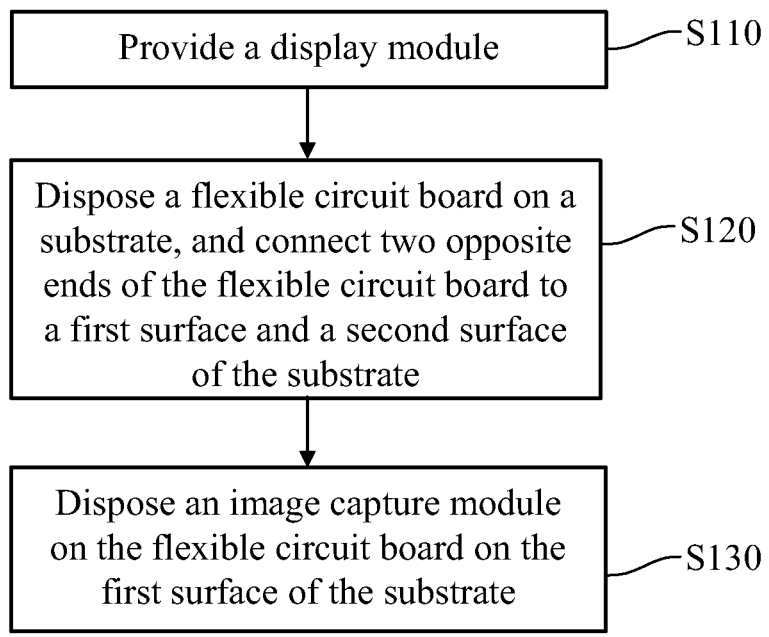
FIGS. 3 to 5 are flow charts of manufacturing processes of the first embodiment of the present invention.

As shown in FIGS. 1 to 3, a display panel 10 according to a first embodiment of the present invention is disposed in a case 220 of a display 20, and in the manufacturing of the display panel 10, a display module 120 is provided (S110).

The display module 120 of the present invention has a substrate 122, a liquid crystal layer 124, and a color filter substrate 126. The substrate 122 is a glass substrate, and may be, but not limited to, a thin-film transistor (TFT)-array substrate (TFT-array substrate). The substrate 122 has a first surface 1222 and a second surface 1224 opposite to each other. In this embodiment, an electrically connecting circuit 130 is electrically disposed on the second surface 1224, and a display area 1226 and a sensing area 1228 adjacent to each other are defined on the first surface 1222.

The display area 1226 is surrounded by a seal 128, the color filter substrate 126 is disposed on the seal 128, and a gap is provided between the color filter substrate 126 and the substrate 122. The liquid crystal layer 124 is disposed in the gap, such that the liquid crystal layer 124 is covered between the substrate 122 and the color filter substrate 126 with the seal 128, so as to prevent composition materials (not shown), such as, TFT, storage capacitor, and liquid crystal molecules disposed in the liquid crystal layer 124 from leaking out of the display module 120. This structure is a well-known composition structure of liquid crystal panel, and is not the main technical feature of the present invention, so the detailed structure will not be repeated herein.

Next, a flexible circuit board 132 is disposed on the substrate 122, and one end of the flexible circuit board 132 is attached on the sensing area 1228 of the first surface 1222 through thermo-compression, and the other end is connected to an electrically connecting circuit 130 of the second surface 1224 (S120), such that an input/output (I/O) circuit of the flexible circuit board 132 is coupled to the electrically connecting circuit 130. Then, the image capture module 140 is electrically disposed on the flexible circuit board 132 through chip size package (CSP) or chip on board (COB) (S130), so as to be coupled to the electrically connecting circuit 130 through the flexible circuit board 132.

The image capture module 140 has an image sensor 142 and a lens 144. The image sensor 142 may be, but not limited to, a complementary metal oxide semiconductor (CMOS) image sensor (CIS), and the lens 144 may be, but not limited to, a plastic lens or a wafer level lens.

Figure 4:
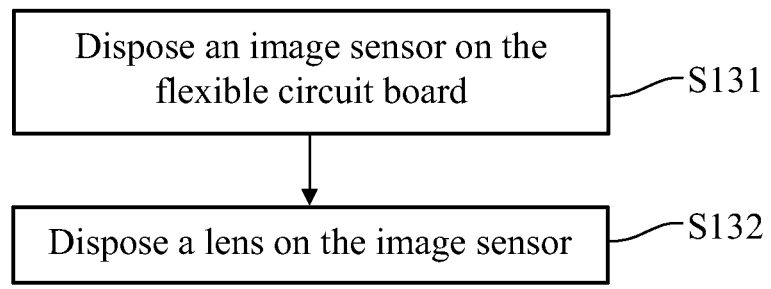
Figure 5:
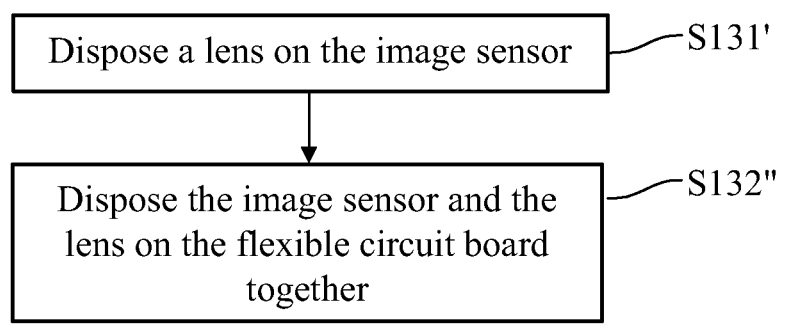

Moreover, as shown in FIGS. 1 and 4, while the image capture module 140 is electrically disposed on the flexible circuit board 132, firstly, the image sensor 142 is optionally electrically disposed on the flexible circuit board 132 (S131), and then, the lens 144 is disposed on the other side of the image sensor 142 opposite to the flexible circuit board 132 (S132). Alternatively, as shown in FIGS. 1 and 5, firstly, the lens 144 is disposed on the image sensor 142 (S131'), and then the image sensor 142 and the lens 144 are disposed on the flexible circuit board 132 together, in which the image sensor 142 contacts with the flexible circuit board 132 (S132"). They are merely different methods for coupling the image capture module 140 to the flexible circuit board 132, but not intended to limit the present invention.

Referring to FIGS. 1 and 2, after the manufacturing of the display panel 10 is completed, the image capture module 140 and the display module 120 are combined into an integrated structure, due to the image capture module 140 is directly electrically disposed on the substrate 122 of the display module 120, such that the volume space occupied by the display panel 10 in the case 220 of the display 20 is reduced. Therefore, in the manufacturing of the display 20, the thickness of the case 220 is reduced, thus achieving the efficacy of reducing the overall size (thickness) of the display 20.

Figure 7:
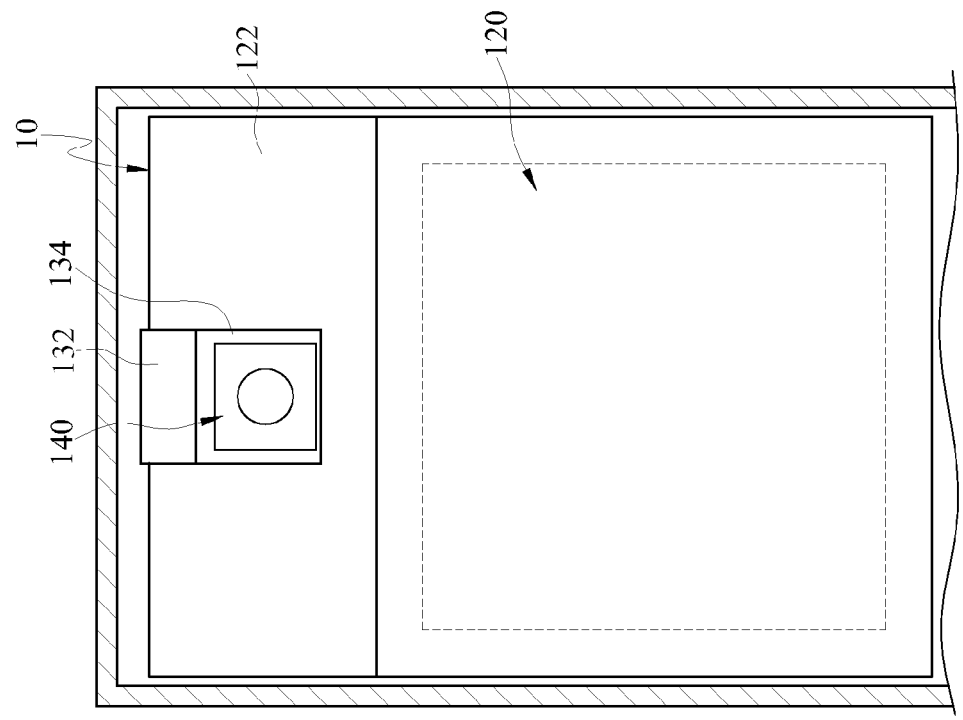
FIG. 7 is a schematic plan view of the second embodiment of the present invention.
Figure 6:
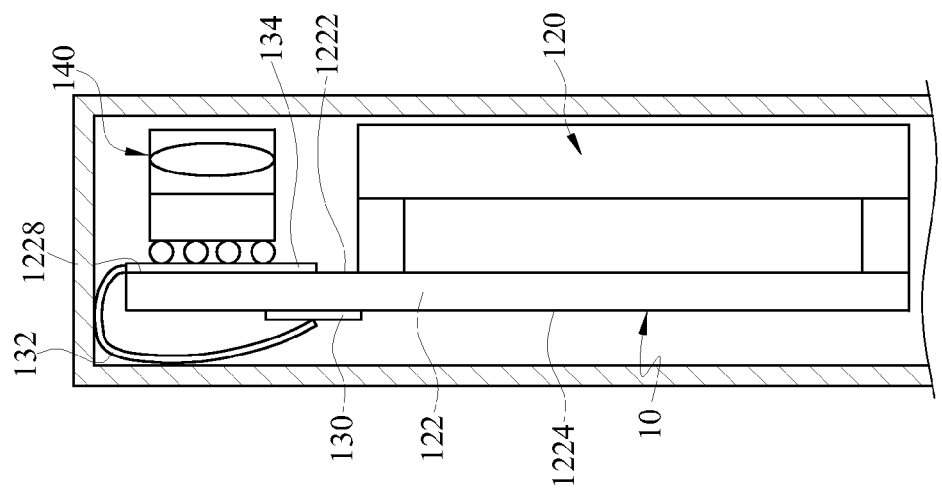
FIG. 6 is a cross-sectional side view of a second embodiment of the present invention.

As shown in FIGS. 6 and 7, a display panel 10 according to a second embodiment of the present invention is shown. The second embodiment of the present invention has substantially the same structure as the first embodiment, and the differences therebetween are described bellow.

In the display panel 10 of the second embodiment of the present invention, a rigid-flexible composite board is coupled between the image capture module 140 and the electrically connecting circuit 130 of the second surface 1224.

Figure 8:
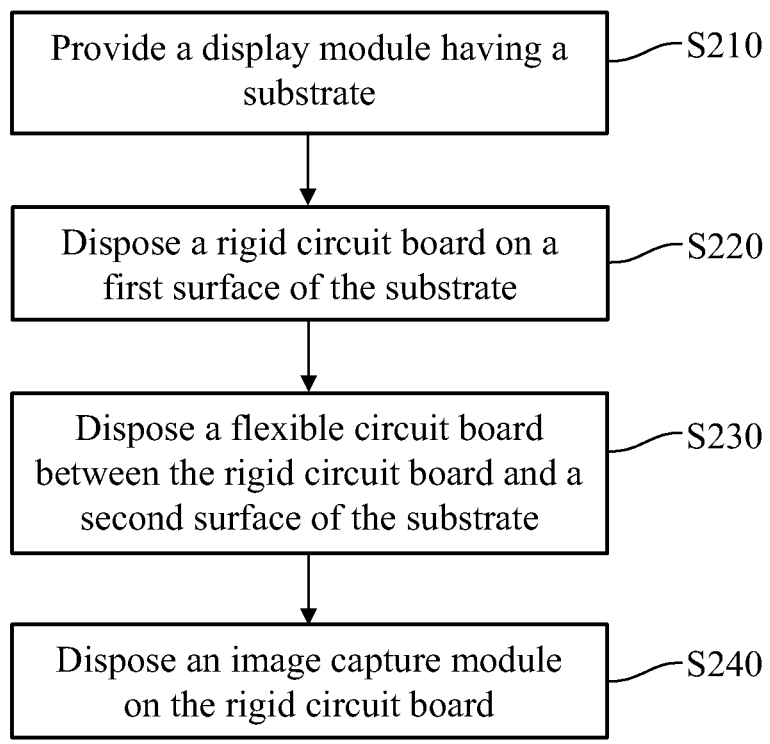
FIG. 8 is a flow chart of manufacturing processes of the second embodiment of the present invention.

As shown in FIGS. 6 to 8, during the manufacturing, after the display module 120 is provided (S210), a rigid circuit board 134 is electrically disposed on a sensing area 1228 of a first surface 1222 (S220). Next, a flexible circuit board 132 is disposed between the rigid circuit board 134 and an electrically connecting circuit 130 of the second surface 1224 (S230), in which two opposite ends of the flexible circuit board 132 are coupled to the rigid circuit board 134 and the electrically connecting circuit 130 respectively. Thereafter, an image capture module 140 is electrically disposed on the rigid circuit board 134 (S240), so as to be coupled to the electrically connecting circuit 130 of the substrate 122 through the rigid circuit board 134 and the flexible circuit board 132. At the same time, by means of the mechanical strength of the material of the rigid circuit board 134, the planarity of the image capture module 140 on the substrate 122 is maintained.

Figure 10:
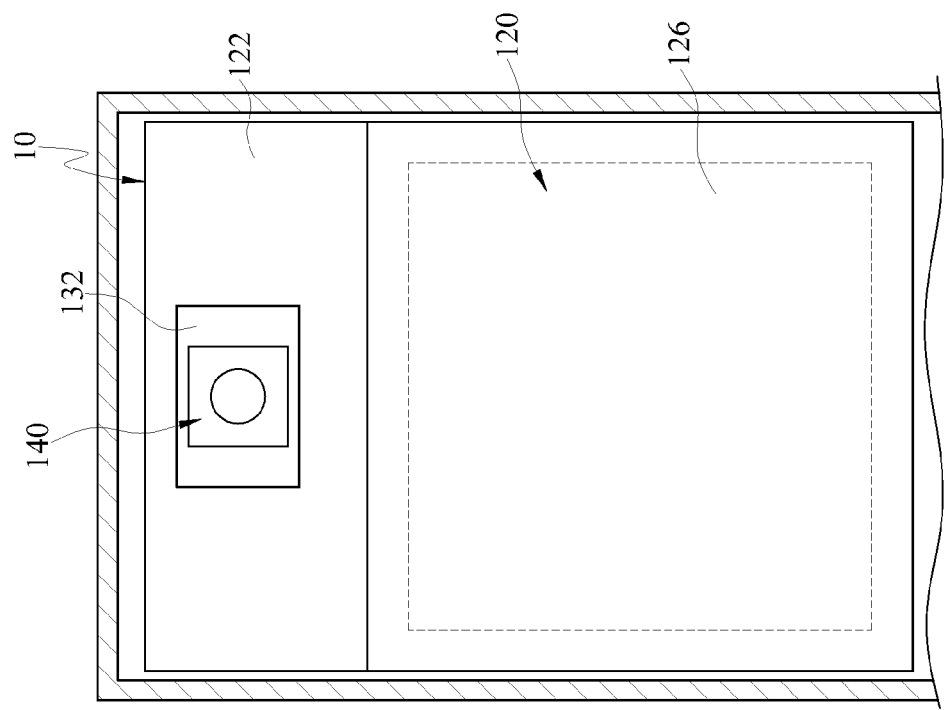
FIG. 10 is a schematic plan view of the third embodiment of the present invention.
Figure 9:
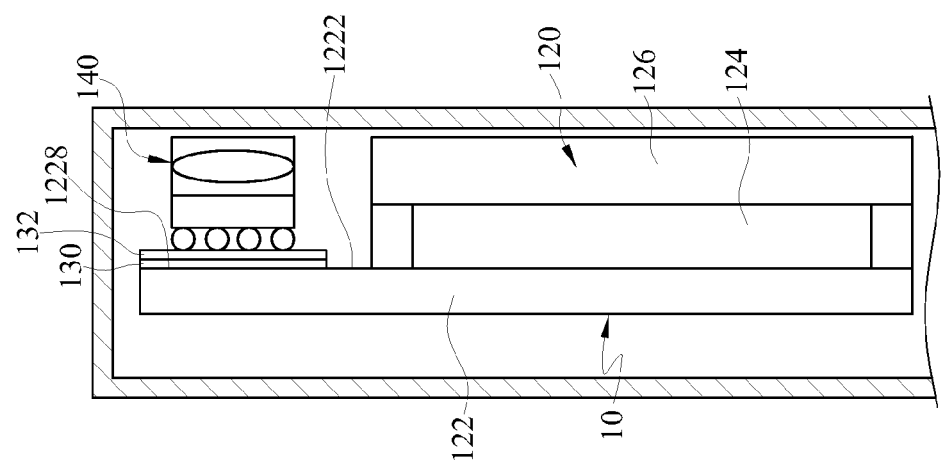
FIG. 9 is a cross-sectional side view of a third embodiment of the present invention.

Referring to FIGS. 9 and 10, a display panel 10 according to a third embodiment of the present invention is shown. The difference between the third embodiment and the first embodiment lies in that, in the display module 120, an electrically connecting circuit 130 is disposed at a difference position on a substrate 122.

Figure 11:
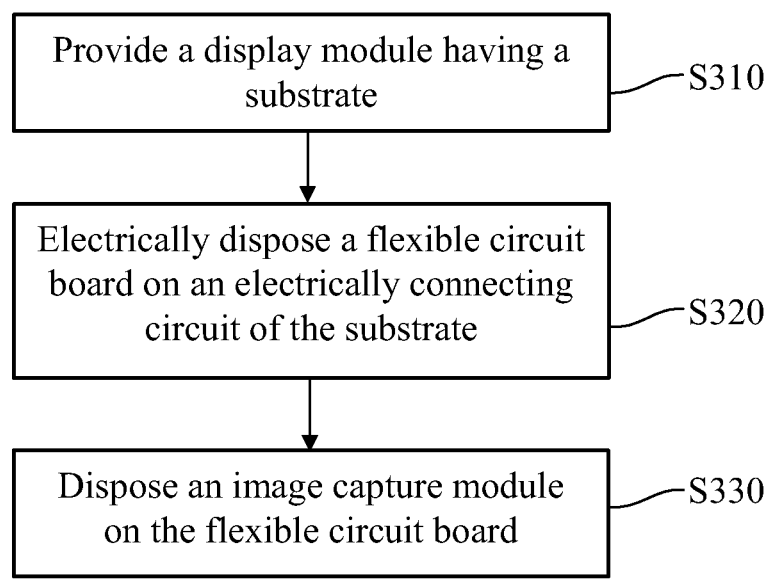
FIG. 11 is a flow chart of manufacturing processes of the third embodiment of the present invention.

As shown in FIGS. 9 to 11, in the display panel 10 according to the third embodiment of the present invention, the electrically connecting circuit 130 on the substrate 122 is disposed on a sensing area 1228 of the first surface 1222. Therefore, during the manufacturing, after a display module 120 is provided (S310), a flexible circuit board 132 is electrically disposed on an electrically connecting circuit 130 of the sensing area 1228 (S320), and is located at the same side of the substrate 122 with a liquid crystal layer 124 and a color filter substrate 126. Finally, an image capture module 140 is electrically disposed on the flexible circuit board 132, such that the image capture module 140 is electrically communicated with the electrically connecting circuit 130 through the flexible circuit board 132.

Similarly, in the third embodiment of the present invention and other embodiment, a rigid circuit board may be disposed between the image capture module and the flexible circuit board to improve the planarity of the image capture module on the substrate.

Figure 13:
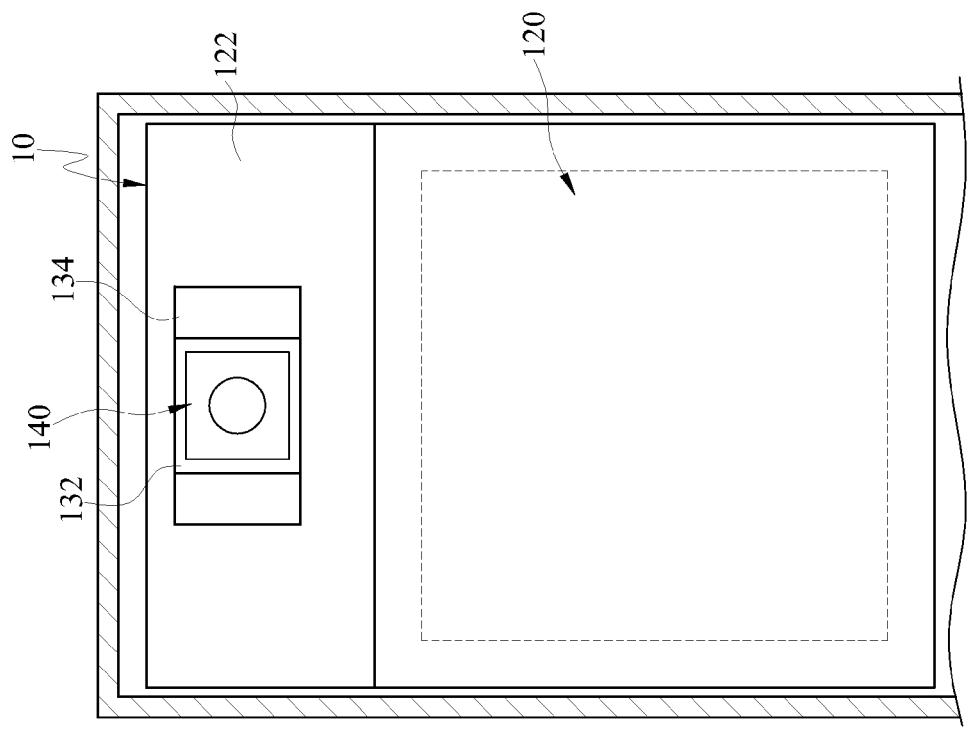
FIG. 13 is a schematic plan view of the fourth embodiment of the present invention.
Figure 12:
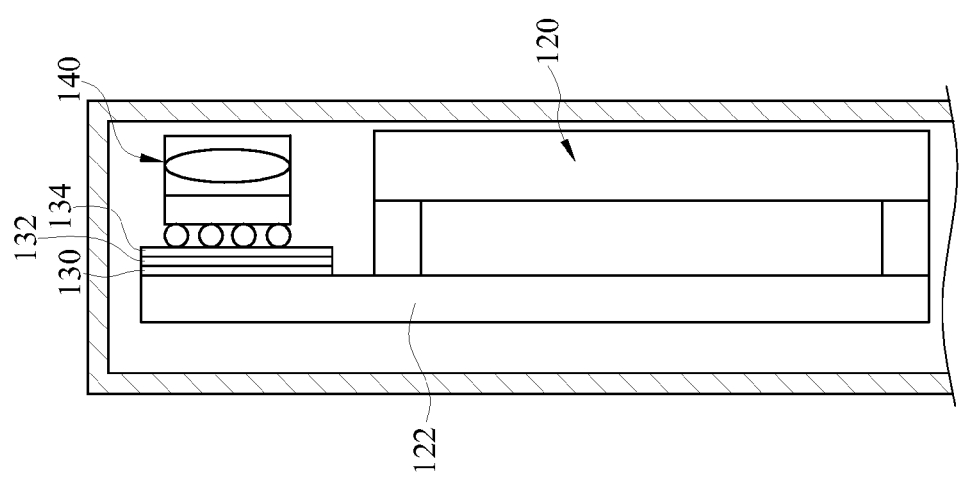
FIG. 12 is a cross-sectional side view of a fourth embodiment of the present invention.
Figure 14:
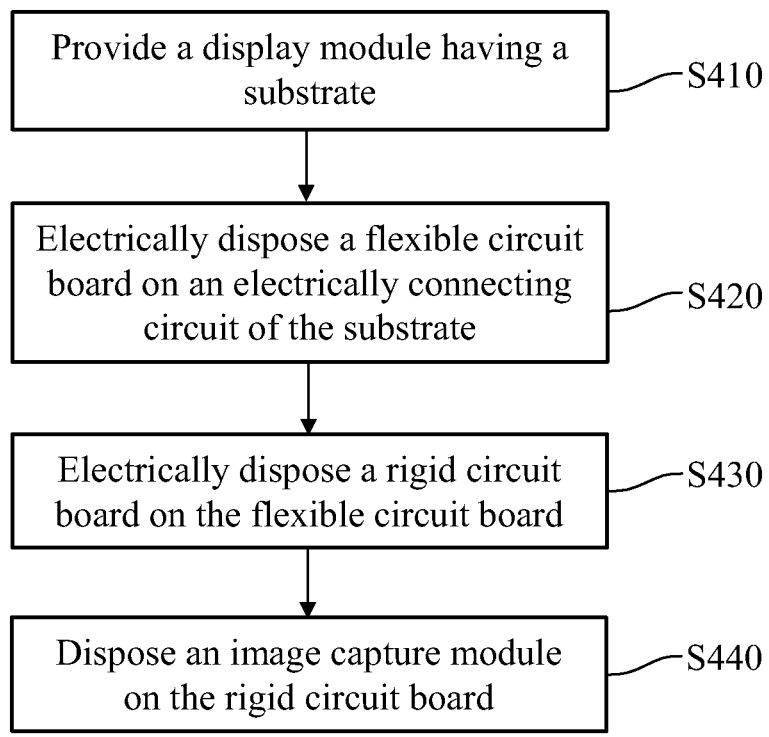
FIG. 14 is a flow chart of manufacturing processes of the fourth embodiment of the present invention.

As shown in FIGS. 12 to 14, in a fourth embodiment of the present invention, after a display module 120 is provided (S410), and a flexible circuit board 132 is electrically disposed on an electrically connecting circuit 130 of a substrate 122 (S420), a rigid circuit board 134 is electrically disposed on the flexible circuit board 132 (S430). Next, an image capture module 140 is electrically disposed on the rigid circuit board 134 (S440), so as to maintain the planarity of the image capture module 140 on the substrate 122 by means of the rigid circuit board 134. Moreover, the image capture module 140 is coupled to the electrically connecting circuit 130 through the rigid circuit board 134 and the flexible circuit board 132, such that the image capture module 140 and the display module 120 are electrically communicated with each other.

Figure 16:
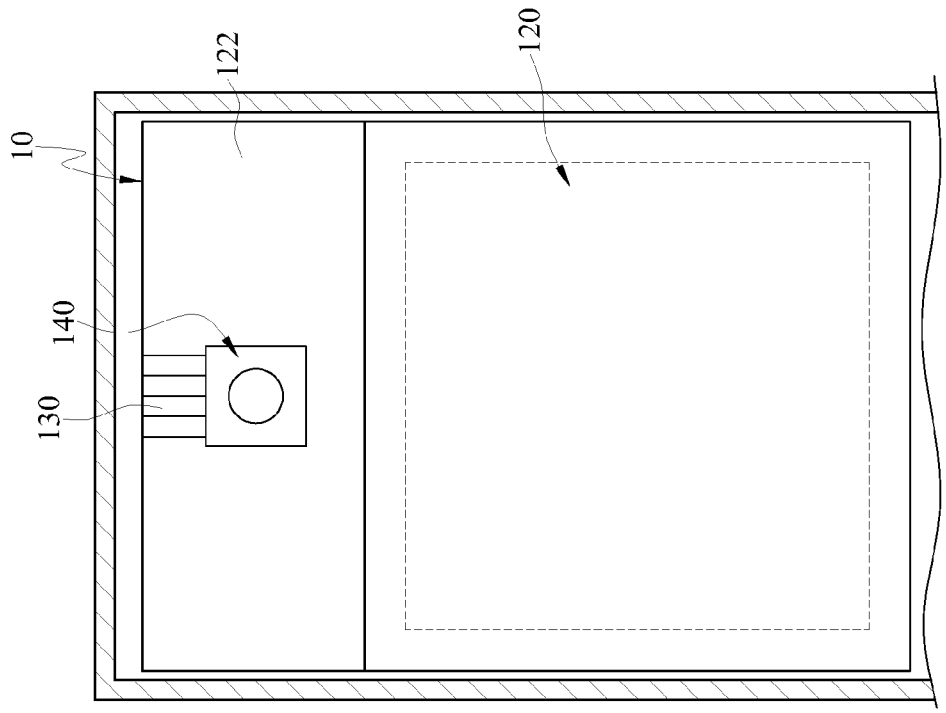
FIG. 16 is a schematic plan view of the fifth embodiment of the present invention.
Figure 15:
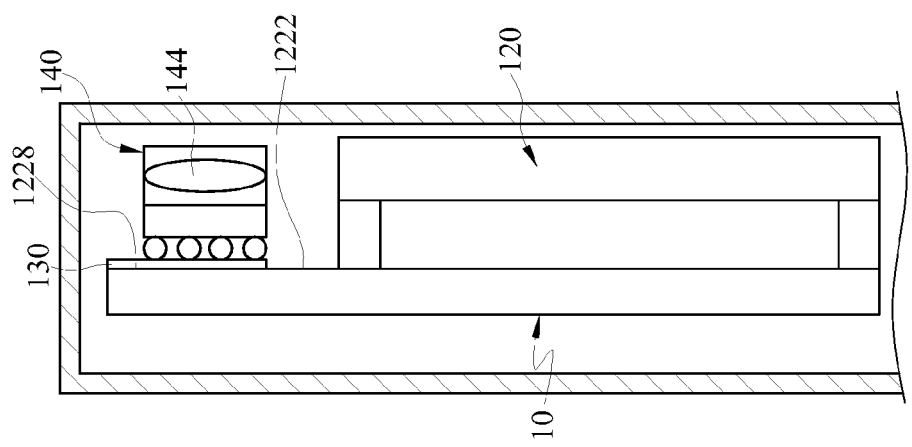
FIG. 15 is a cross-sectional side view of a fifth embodiment of the present invention.
Figure 17:
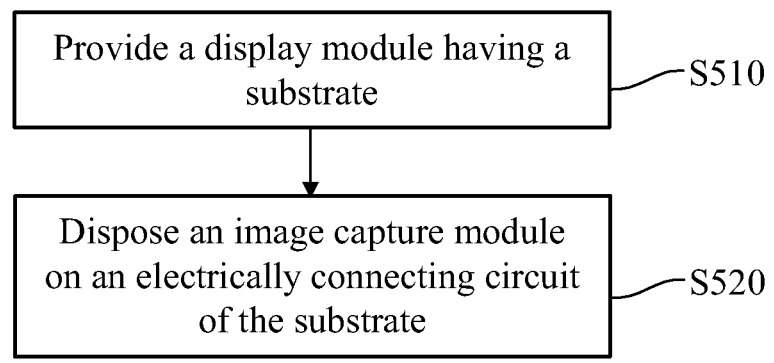
FIG. 17 is a flow chart of manufacturing processes of the fifth embodiment of the present invention.

Furthermore, in the embodiments of the present invention, when the lens used in the image capture module is a wafer level lens, the lens is directly embedded on the substrate of the display module through a surface mounting technology (SMT) or a high-temperature process, and thus the manufacturing procedure of disposing the flexible circuit board and the rigid circuit board is omitted. As shown in FIGS. 15 to 17, in a display panel 10 according to a fifth embodiment, a lens 144 of an image capture module 140 is selected from wafer level lenses. During the manufacturing process of the display panel 10, after a display module 120 having a substrate 122 is provided (S510), by means of the feature of high-temperature resistance of the wafer level lens, the image capture module 140 is directly electrically disposed on an electrically connecting circuit 130 of a sensing area 1228 through an SMT or high-temperature process, such that the image capture module 140 is coupled on a first surface 1222 of the substrate 122, thus being combined with the display module 120 into an integrated structure.

The display panel of the present invention is applied in displays, through the structure design that the image capture module and the display module are combined into an integrated structure, the volume occupied by the display panel in the display is reduced, such that the thickness of the case of the display is reduced, thus having the efficacy of reducing the overall size of the display.

What is claimed is:

1. A display panel, comprising:
a display module, having a substrate, wherein the substrate has a first surface and a second surface opposite to each other, and a display area is defined on the first surface;
at least one image capture module, disposed on the first surface, and coupled to the substrate, including:
an image sensor disposed on the first surface; and
a lens disposed on a side surface of the image sensor,
at least one electrically connecting circuit disposed on the second surface; and
a flexible circuit board,
wherein the image sensor is disposed between the substrate and the lens;
wherein one end of the flexible circuit board connects to the electrically connecting circuit and the other end of the flexible circuit board is disposed between the first surface and the image capture module; and
wherein the image capture module is coupled to the electrically connecting circuit through the flexible circuit board.

2. A display panel, comprising:
a display module, having a substrate, wherein the substrate has a first surface and a second surface opposite to each other, and a display area is defined on the first surface;
at least one image capture module, disposed on the first surface, and coupled to the substrate, including:
an image sensor disposed on the first surface; and
a lens disposed on a side surface of the image sensor,
at least one electrically connecting circuit disposed on the second surface;
a rigid circuit board electrically disposed between the first surface and the image capture module; and
a flexible circuit board disposed between the electrically connecting circuit and the rigid circuit board,
wherein the image sensor is disposed between the substrate and the lens; and
wherein the image capture module is coupled to the electrically connecting circuit through the rigid circuit board and the flexible circuit board.

3. An assembling method of a display panel, comprising:
providing a display module, wherein the display module has a substrate, and the substrate has a first surface and a second surface opposite to each other;
disposing an electrically connecting circuit on the second surface;
disposing a flexible circuit board on the substrate; and
disposing an image capture module on the first surface, and coupling the image capture module to the substrate,
wherein the image capture module includes:
an image sensor disposed on the first surface; and
a lens disposed on a side surface of the image sensor;
wherein the image sensor is disposed between the substrate and the lens;
wherein one end of the flexible circuit board is disposed on the first surface, the other end of the flexible circuit board is connected to the second surface and is coupled to the electrically connecting circuit; and
wherein the image capture module is disposed on the flexible circuit board, so as to be coupled to the electrically connecting circuit through the flexible circuit board.

4. The assembling method of the display panel according to claim 3, wherein the image capture module is disposed on the first surface through chip on board (COB) or chip size package (CSP).

5. An assembling method of a display panel, comprising:
providing a display module, wherein the display module has a substrate, and the substrate has a first surface and a second surface opposite to each other;
disposing an electrically connecting circuit on the second surface;
disposing a rigid circuit board on the first surface;
disposing a flexible circuit board between the rigid circuit board and the electrically connecting circuit; and
disposing an image capture module on the first surface, and coupling the image capture module to the substrate,
wherein the image capture module includes:
an image sensor disposed on the first surface; and
a lens disposed on a side surface of the image sensor;
wherein the image sensor is disposed between the substrate and the lens;
wherein one end of the flexible circuit board is electrically connected to the rigid circuit board, and the other end of the flexible circuit board is coupled to the electrically connecting circuit; and
wherein the image capture module is electrically disposed on the rigid circuit board, so as to be coupled to the electrically connecting circuit through the rigid circuit board and the flexible circuit board.

* * * * *